INVENTORS
NORDIN C. ANDERHOLM
ALBERT GOODMAN
BY

United States Patent Office 3,605,486
Patented Sept. 20, 1971

3,605,486
METHOD AND APPARATUS FOR MEASURING ADHESION OF MATERIAL BONDS
Nordin C. Anderholm and Albert Goodman, Albuquerque, N. Mex., assignors to the United States of America as represented by the United States Atomic Energy Commission
Filed Jan. 21, 1970, Ser. No. 4,664
Int. Cl. G01n 3/30
U.S. Cl. 73—95        5 Claims

ABSTRACT OF THE DISCLOSURE

Measuring adhesion of one material to another and tensile strength of the bond between these materials by producing a pulse of tensile stress in the materials and subjecting the bond to the tensile stress such as by impinging a pulse of radiant energy against a surface of one of the materials to produce a compressive stress wave within the material, reflecting the stress wave from a free surface of the other material and subjecting the bond between the materials to the reflected tensile wave. The strength of the bond may be determined by incrementally increasing the tensile stress wave amplitude to effect bond failure and the tensile strength determined by measuring this amplitude.

BACKGROUND OF INVENTION

Materials may be bonded or attached to each other by bonding agents or adhesives, molecular forces, and the like. When such bonded materials are used, they may be subjected to stresses which may damage or disrupt the bond and cause a material failure. Many of these stresses may result from dynamic forces having a wide range of amplitudes for a relatively short time duration. In order to insure that a bond or bonds between materials can withstand these dynamic forces and stresses, it may be desirable to provide some test of the bond before actual usage.

The determination of adhesion and/or bond strength between two materials may be difficult to obtain or measure by conventional techniques, particularly in coating or thin-film technology. Considerable effort may be expended during the processing of the materials, such as a substrate and coating, to attempt to provide good adhesion by controlling surface cleanliness, environment, and material purity. When the materials have been bonded together, however, it may still be desirable to obtain some quantitative or qualitative determination of adhesion of these materials.

Conventional techniques now being used to obtain some idea of adhesion between materials include the commonly referred to "thumbnail," "tape" and "scratch" tests. With the "thumbnail" test, one of the materials may be scratched with a fingernail or other object to see whether a material, generally a film or coating, will stay on another material or fall off. The "tape" test may be characterized as a comparison between the adhesion of one material to the tape and the adhesion of the material to another material. With this test, a coating material bond may be considered acceptable if the materials remain bonded when the tape is pulled off. Of course, cleanliness of the free surface of the material to which the tape is applied, the tape application pressure, tape characteristics, etc., may all be unknowns which may degrade the technical value of the test. The "scratch" test may involve scratching the surface of the coating material with a point of predetermined radius and specified loading. With this latter test, the stress applied to the coating material is a shear stress rather than a tensile stress and thus does not give a true picture of tensile strength. Further, the relative hardnesses of these two materials and the point material may adversely affect the results. All of these tests are static or relatively long term tests rather than dynamic tests. It is readily apparent that with these conventional tests, the result may not even be qualitative, let alone quantitative.

Thus, there is a need for both a quantitative and qualitative dynamic adhesion and tensile strength test of material bonds, such as for thin films or coatings which are bonded in some manner to some other material or a substrate, especially for very thin films or coatings.

Applications where such measurements may be desirable include determinations of adhesion and tensile strengths of thin film resistors or printed circuits to a substrate, paint, mirror coatings, bond strengths of adhesives, epoxy bonding between parts, and other related areas.

SUMMARY OF INVENTION

In view of the above, it is an object of this invention to provide method and apparatus for dynamically measuring the adhesion and tensile strength of bonds between materials.

It is a further object of this invention to provide such a measurement for thin coatings of a material on another material.

It is a still further object of this invention to provide a test for measuring adhesion which may be performed in a non-destructive manner.

Various other objects and advantages will appear from the following description of one embodiment of the invention, and the most novel features will particularly be pointed out hereinafter in connection with the appended claims. It will be understood that various changes in the details, materials and arrangements of the parts, which have been herein described and illustrated in order to explain the nature of the invention may be made by those skilled in the art.

The invention comprises producing a pulse of tensile stress in bonded materials, subjecting the bond to the tensile stress and determining the integrity of the stressed bond.

DESCRIPTION OF DRAWING

The invention is illustrated in the accompanying drawing wherein.

DETAILED DESCRIPTION

Figure 1:
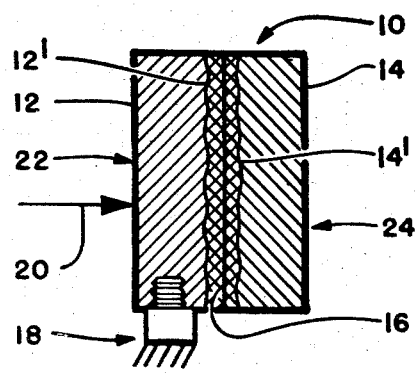
FIG. 1 is a cross-sectional somewhat enlarged view of bonded materials.

Bonded materials which may be tested by the apparatus and method of this invention are shown in FIG. 1 designated by element 10. Element 10 may include a first material 12, which may be referred to for purposes of this invention as a base member or substrate, and a second material 14 bonded together at a suitable interface or joint 16. Materials 12 and 14 may be any combination of the same, similar or dissimilar materials which are bonded directly to each other or with one or more layers of additional bonding or adhesive materials. Materials 12 and 14 may thus be bonded through zones 12' and 14' respectively (shown for purpose of illustration with exaggerated thickness) to achieve a desired adhesion.

Either of the materials may be a coating or thin film (i.e., a layer of material deposited by conventional evaporation, sputtering or accelerated ion techniques, a coating of adhesive, a layer of pain, or the like) or any combination of thicknesses. By coating or thin film, it is generally meant a film of about 0.1 millimeter (0.004 inch) or less, though it is understood that this invention may be equally practiced and applicable to coatings or films considerably thicker, the principal advantages of this invention being with thinner films.

Element 10 may be supported by an appropriate mounting means or fastener 18 so that desired stresses may be applied to element 10 in accordance with the teachings of this invention. A unidirectional stress may be applied to one of the materials 12 or 14, such as represented by arrow 20 against face 22, to initiate a tensile stress wave within the materials. The bond between the materials may then be subjected to the tensile stress wave to test the adhesion of the bond or measure the tensile strength thereof.

Figure 2A:
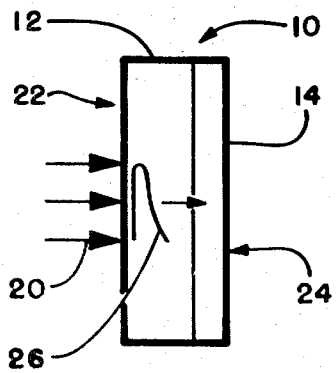
FIGS. 2a, 2b and 2c are diagrammatic representations of a material sample being subjected to the desired stresses illustrating principles of this invention.
Figure 2B:
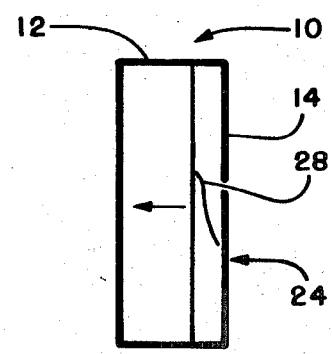
Figure 2C:
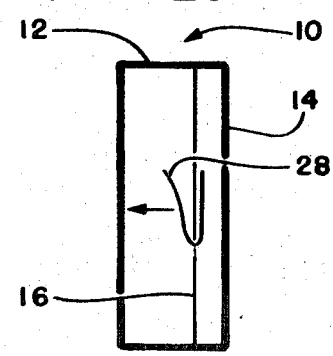

The effect of stress 20 on element 10 is shown in detail in the expanded element 10 of FIGS. 2a, 2b and 2c. For purpose of describing features of this invention, material 14 may be considered as a coating or thin film (illustrated with exaggerated thickness). Stress 20 may be a compressive stress applied against a surface (face 22) of substrate 12 opposite to the surface on which coating 14 is applied. The outer surface 24 of coating 14 is preferably left as a "free surface" to minimize losses which might occur if an additional material was placed adjacent to surface 24 from reflections at the interface thereof or from dissipation within the additional material and to minimize other complications which may arise therefrom. As stress 20 is applied to surface 22 of substrate 12, a compressive stress or pressure wave 26 may be produced in material 12 traveling in the direction of the arrow. Compressive stress wave 26 may continue through substrate 12, bond 16 and coating 14 applying a compressive force to the respective materials. When compressive stress wave 26 reaches the free surface 24 of coating 14, the compressive stress wave is reflected therefrom in the form of a tensile stress wave 28 (FIG. 2b) traveling in the direction of the arrow. During the wave transformation at free surface 24, the respective compressive and tensile stress waves 26 and 28 may cancel at least a portion of the respective effects thereof. As compressive stress wave 26 is transformed substantially or completely to the tensile stress wave 28, the amplitude of the latter increases to its maximum. With the pulse width of stress 20 appropriately chosen with respect to the thickness of coating 14, the tensile stress wave may achieve its maximum at or before reaching bond 16, as shown in FIG. 2c. Such a tensile stress wave will thus apply a tensile stress to bond 16 which, depending upon the strength of bond 16, may determine the adhesion of material 14 to material 12.

Stress 20 may be produced by the application of a mechanical impulse or pressure wave generated by absorption of a suitable beam of radiation impinging directly or indirectly against element 10 or by an electromechanical or the like transducer. Stress 20 should be a single, unidirectional pulse having an appropriate shape and rise and fall times and duration to subject the bond or interface 16 to a desired amplitude of tensile stress. Repetitive stresses may be applied by a series of repetitive, like or increasing amplitude pulses, depending on the desired stress test, having sufficient space between pulses to subject the bond to separate and distinct tensile stresses.

Figure 3:
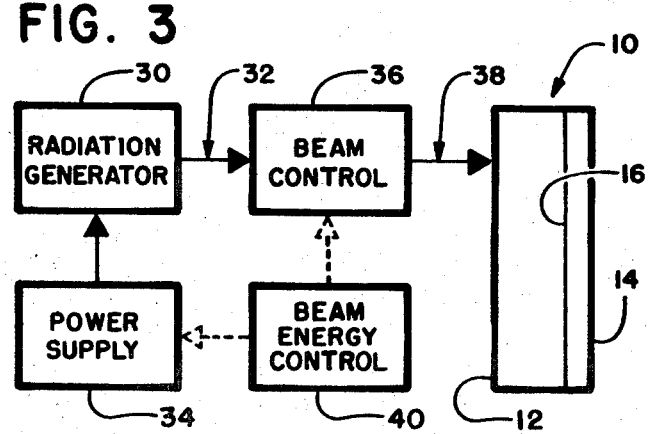
FIG. 3 is a block diagram of apparatus to produce the desired stresses in a material to test bonds in accordance with this invention.

Referring to FIG. 3, an apparatus arrangement is shown for producing a high energy pulsed beam of radiation and for directing the beam against a surface of an element to be tested to produce a compressive stress on the element, such as element 10 in FIGS. 1 and 2 where material 14 is a thin film. The apparatus, as shown, may include a radiation generator or source 30 capable of generating an appropriate beam of radiation 32 upon being energized by power supply 34 or otherwise initiated. Beam 32 may be impinged directly against element 10 or it may be controlled or modified in some desired fashion by beam control mechanism or device 36 with the resulting beam 38 impinged upon element 10. In some applications, it may be desirable to include some suitable beam energy control system 40 which may act upon power supply 34 or beam control 36, depending upon the characteristics of particular radiation generator 30 used.

Figure 4:
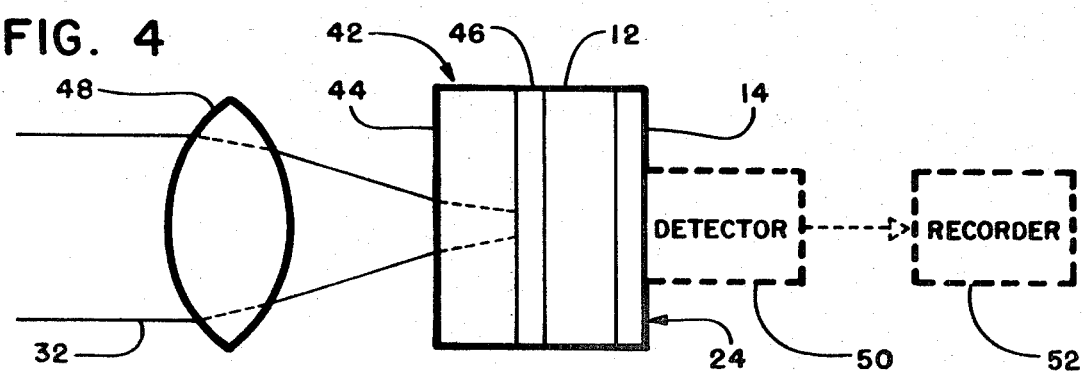
FIG. 4 is a diagrammatic view showing details of a modified form of the embodiment of FIG. 3.

Any suitable pulsed radiation beam may be utilized which is capable of conversion to a mechanical force upon impingement against the substrate 12 or against an intermediate element, as described below in FIG. 4. For example, the radiation beam may be composed of laser light, electrons, or other types of electromagnetic or particle radiation. It has been found that in order to achieve the maximum amplitude tensile stress wave at the bond or joint between the substrate 12 and coating 14, it is desirable that the radiation beam be produced as a pulse having the desired pulse shape with a duration generally less than the thickness of coating 14. Such short term, high energy radiation pulses may be best achieved for very thin coating 14 thicknesses with a laser light beam. For somewhat thicker coatings 14, the radiation beam may be one or more of the other types of radiation.

In order to insure that the energy of radiation beam 32 is efficiently converted to compressive stress wave 26 upon impingement against substrate 12, it may be desirable to select the substrate to exhibit a high absorption coefficient for the radiation beam used. High efficiency absorption may be insured by utilizing as part of the beam control system 24 a conversion element 42, as shown in FIG. 4. Conversion element 42 may include an inertial confinement member 44 which is substantially transparent to radiation beam 32 together with a high radiation energy absorbing film 46. With such an arrangement, film 46 may be evaporated or otherwise deposited upon member 44 by conventional techniques with a thickness from about $5 \times 10^{-6}$ to $5 \times 10^{-4}$ millimeters, depending upon the type and energy of radiation used. Member 44 may be any convenient thickness which will provide the desired inertial confinement while minimizing absorption losses. Substrate 12 may then be bonded or otherwise attached to film 46 to provide high acoustic impedance and efficient transmission of the pressure waves which are generated within film 46. Beam control system 36 may also include a suitable optical or electrical lens 48, depending upon the type of radiation utilized, to confine the radiation to a specified area and provide some adjustment of the beam energy per unit area.

For electron beam applications, a good electron beam absorber, like tungsten, may be utilized for film 46, with an appropriate electron transparent member 44. In some applications, the inertial confinement member may be eliminated, if desired.

In an apparatus utilizing a laser as radiation generator 30 which produces a laser beam having a wave length of about .2 to 4 microns, inertial confinement member 44 may be made of quartz with absorber film 46 made of aluminum or copper. With a 5-joule laser pulse having a pulse duration of about 20 nanoseconds impinging upon an aluminum absorber film about 0.5 micron thick, compressive stress waves, and consequently tensile stresses, may be produced of tens of kilobars in amplitude. Laser beams having pulse durations from about .001 to 100 nanoseconds and $10^{-1}$ to $10^{-2}$ joules energy may be conventionally produced.

Beam energy control 40 may be any appropriate means which may vary either beam energy or beam energy per unit area, such as for a laser beam apparatus, it may comprise some type of positioning device for lens 48. For an electron beam apparatus, energy control 40 may provide an adjustment of the acceleration voltage provided by power supply 34 or of the distance between generator 30 and element 10.

This apparatus may be utilized in any application where it is desired to test the adhesion between one material and another or the tensile strength thereof. A typical application may be as part of a manufacturing production procedure to test the adhesion of a material on another to insure that the adhesion is above some predetermined level. Samples of materials may be removed from a production line on a random or statistical basis and the materials subjected to a particular radiation beam energy level which has been previously determined by empirical testing. Assuming that the material bond is not destroyed by this predetermined energy level and stress waves produced therefrom, a quality assurance of the sample or product may be provided.

The predetermined energy level to be used may be derived by applying a suitable stress gauge 50 (in FIG. 4) to free surface 24 of coating 14 and subjecting element 10 to different levels of radiation beam energy until the desired stress level is sensed by detector 50. A record of such stress levels may be maintained by an appropriate recorder 52. The actual tensile strengths of bonds may be determined by utilizing the arrangement shown in FIG. 4 with detector 50 and recorder 52 by subjecting different samples of the substrate and coating to successive radiation pulses of increasing energy beginning at a pressure level below the failure pressure using smaller incremental steps of energy change. This may be repeated using ever decreasing incremental steps until the desired accuracy is achieved. It will be understood, that for each application of the radiation beam and stress it may be desirable to use a new sample since adhesion may be detrimentally affected by previous stress waves. For sufficiently large samples and with highly focused radiation beams, multiple tests may be run on a single sample by subjecting different areas of the sample to the radiation beam for each test. Also, life tests may be run using successive pulses of like amplitude and recording the number of pulses to failure. Further, there may be applications and techniques where the material bonds may be non-destructively tested by proper selection of stress wave levels.

Figure 5:
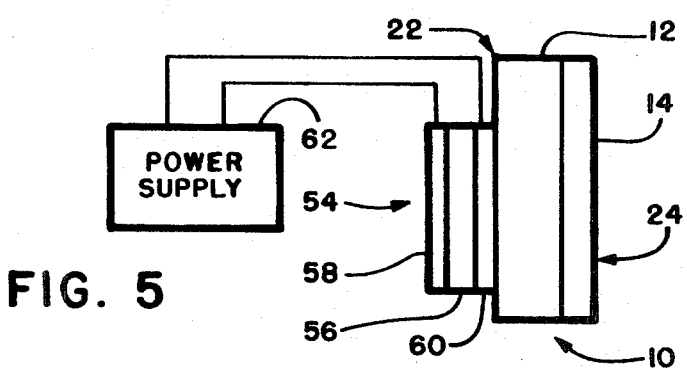
FIG. 5 is a diagrammatic view of another embodiment of this invention.

Compressive or tensile stress waves may also be produced with arrangements of the type shown in FIG. 5 utilizing an electromechanical transducer 54 either attached in some more appropriate manner directly to either surfaces 22 or 24 of element 10 or coupled thereto through a suitable stress wave transmitting medium (not shown). A stress wave transmitting medium may be a fluid bath of such as oil or the like. Electromechanical transducer 54 may include a piezoelectric element 56 sandwiched between electrodes 58 and 60 and energized by a power supply 62. Other types of transducers which may be utilized include magnetostrictive transducers. It is understood that any type of transducer may be used which is capable of producing a single, unitary direction pulse of the desired pulse shape and pulse duration. With transducer 54 attached as shown or otherwise coupled to surface 22, it may be energized to produce either a compressive or tensile stress wave, whereas with it coupled to surface 24, it would be desirable that it produce a tensile stress wave.

Such tests may be readily performed under any desired and relatively easily provided environmental conditions and with limited safety precautions for personnel. The bonds may be tested over a wide range of tensile strengths with any desired test sensitivity under readily controlled and highly repeatable conditions. The results may be quantitatively analyzed or utilized on a comparative or qualitative type situation.

There may be applications where very high amplitude stress waves may be required and where material thicknesses do not require such short pulse lengths. In these types of applications, conventional force generators may be used, such as air guns and high explosives, to produce the desired compressive and reflecting tensile stress waves. Such applications, because of the nature of the shock producing mechanisms, may require more stringent safety precautions and specialized facilities to insure personnel and equipment safety. Measurements of results of such tests under these conditions may often be difficult to obtain since the material samples may often be destroyed or heavily damaged at some point in the test by destructive mechanisms or other forces inherently produced by these force generators.

What is claimed is:
1. Apparatus for determining adhesion of a first material on a second material comprising means for supporting said materials with a surface of said second material as a free surface, laser means for producing a unidirectional pulse of radiation, means including a transparent element intermediate said laser means and a surface of said first material opposite said free surface and a laser energy absorbing material intermediate said transparent element and said first material in contact with said first material surface for directing energy from said radiation pulse against said surface of said first material for producing a tensile stress in said materials, and means for varying the energy level of said radiation pulse.

2. The system of claim 1 including means for measuring the stress on said materials.

3. The system of claim 1 wherein said second material is a thin film.

4. A method for determining adhesion of a first material on a second material comprising directing a unidirectional pulse of force against one of said materials, generating a compressive stress wave in said one material with said unidirectional pulse and reflecting said compressive stress wave at a free surface of the other material producing a reflected tensile stress wave in said other material, applying said tensile stress wave to the bond between said materials, and measuring the amplitude of said tensile stress wave at which the bond between materials fails.

5. The method of claim 4 including directing successive force pulses against said materials until a coating fails.

References Cited
UNITED STATES PATENTS

| | | | |
|---|---|---|---|
| 2,280,226 | 4/1942 | Firestone | 73—67.8 |
| 2,778,002 | 1/1957 | Howry | 73—67.9UX |
| 3,009,353 | 11/1961 | Erdman | 73—67.9 |
| 3,461,294 | 8/1969 | Ehrenstein et al. | 250—42X |

OTHER REFERENCES

R. E. Lee et al., Excitation of Surface Elastic Waves by Transient Surface Heating, from Applied Physics Letters, vol. 12, No. 1, Jan. 1, 1968, p. 12.

JERRY W. MYRACLE, Primary Examiner

U.S. Cl. X.R.

73—150